(12) United States Patent
Matsugashita

(10) Patent No.: US 8,094,334 B2
(45) Date of Patent: Jan. 10, 2012

(54) IMAGE FORMING APPARATUS FOR MANAGING APPLICATION AND CONTROL METHOD THEREFOR

(75) Inventor: Hayato Matsugashita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1175 days.

(21) Appl. No.: 11/747,415

(22) Filed: May 11, 2007

(65) Prior Publication Data

US 2007/0263243 A1 Nov. 15, 2007

(30) Foreign Application Priority Data

May 12, 2006 (JP) ................................. 2006-134318

(51) Int. Cl.
*G06F 3/12* (2006.01)
*G06K 15/00* (2006.01)

(52) U.S. Cl. ...................................... 358/1.15; 358/1.16

(58) Field of Classification Search .................... 358/1.1, 358/1.9, 1.11, 1.12, 1.13, 1.14, 1.15, 1.16, 358/1.17, 1.18
See application file for complete search history.

(56) References Cited

U.S. PATENT DOCUMENTS

| | | | |
|---|---|---|---|
| 5,170,340 | A | 12/1992 | Prokop et al. |
| 6,947,949 | B2 | 9/2005 | Fujisawa |
| 2002/0138666 | A1 | 9/2002 | Fujisawa |
| 2003/0131083 | A1 | 7/2003 | Inui |
| 2004/0255263 | A1 | 12/2004 | Ando |
| 2006/0041563 | A1 | 2/2006 | Fujisawa |
| 2006/0070087 | A1* | 3/2006 | Ando et al. .................... 719/320 |
| 2007/0019226 | A1* | 1/2007 | Matsuura et al. ............ 358/1.14 |

FOREIGN PATENT DOCUMENTS

| | | |
|---|---|---|
| EP | 0478346 A2 | 4/1992 |
| EP | 1463294 A2 | 9/2004 |
| JP | 11-327824 A | 11/1999 |
| JP | 2000-122853 A | 4/2000 |
| JP | 2002-287990 A | 10/2002 |
| JP | 2002-312311 A | 10/2002 |
| JP | 2004-005586 A | 1/2004 |
| JP | 2004-163997 A | 6/2004 |

OTHER PUBLICATIONS

Tim O'Reilly et al: "Windows 95 in a Nutshell" 1998, O'Reilly, Sebastopol, XP002472985.

* cited by examiner

*Primary Examiner* — Thierry Pham

(74) *Attorney, Agent, or Firm* — Canon USA, Inc., I.P. Division

(57) ABSTRACT

A control method for an image forming apparatus having means for managing a software application includes the steps of: detecting that a job is generated in the image forming apparatus; obtaining notification information of the detected job; and sending the notification information of the job to the application.

8 Claims, 11 Drawing Sheets

FIG. 3

| APPLICATION A | data / application / appA | APPLICATION DEFINITION FILE |
|---|---|---|
| APPLICATION B | data / application / appB | APPLICATION DEFINITION FILE |
| APPLICATION C | data / application / appC | APPLICATION DEFINITION FILE |
| . | . | . |
| . | . | . |
| . | . | . |
| . | . | . |

VERSION OF DEFINITION FILE : 1.0
NAME OF APPLICATION : APPLICATION A
DESCRIPTION OF APPLICATION : EXECUTE APPLICATION A
ACCEPTABLE JOB TYPE : COPY JOB, SCAN JOB
OUTPUT JOB TYPE : SAVE JOB, FACSIMILE JOB
AVAILABLE RESOURCE INFORMATION :
MANUFACTURER OF APPLICATION :
VERSION OF APPLICATION :
...
...

| FIG. 12A |
|---|
| FIG. 12B |

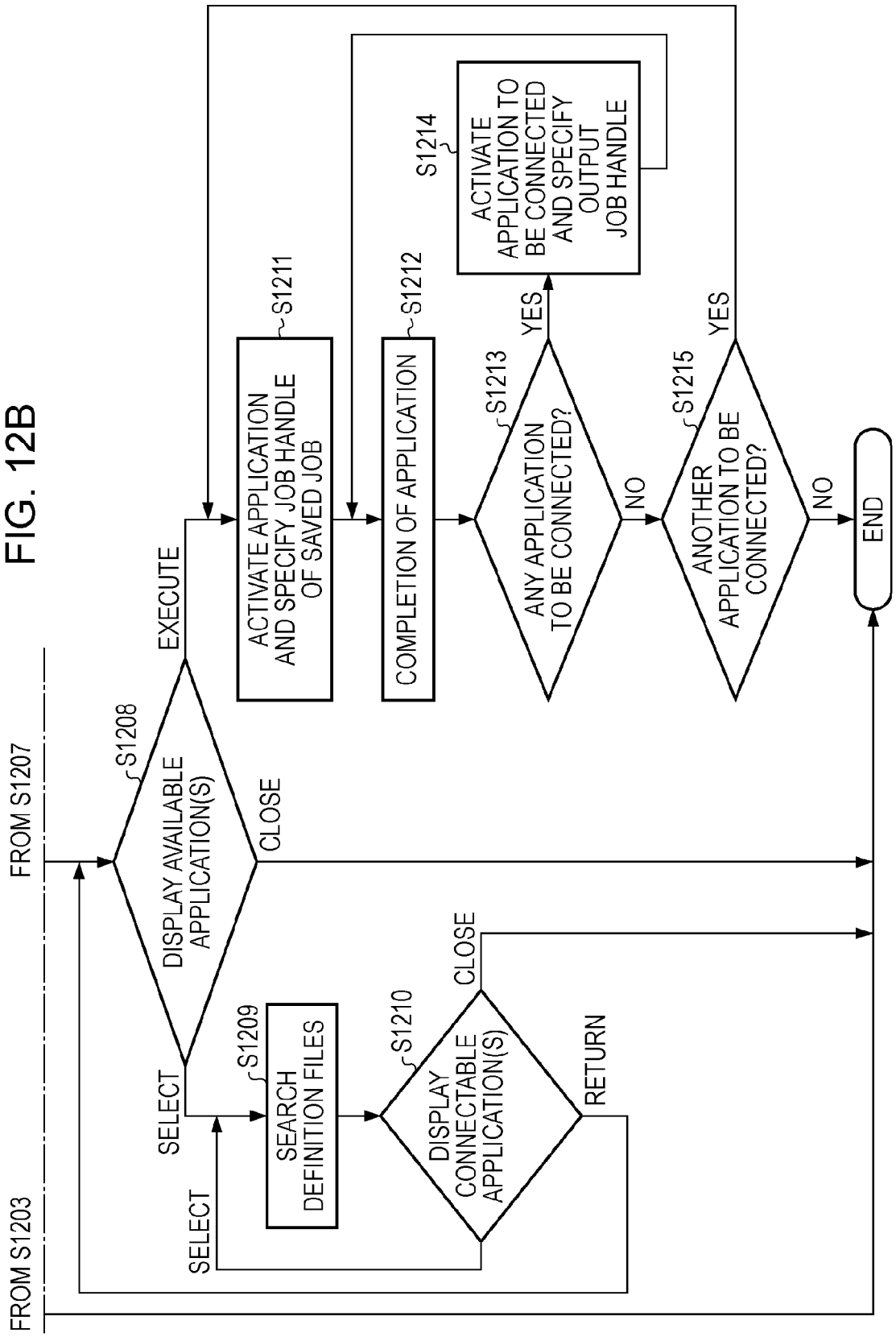

IMAGE FORMING APPARATUS FOR MANAGING APPLICATION AND CONTROL METHOD THEREFOR

BACKGROUND OF THE INVENTION

1. Field of the Invention

The present invention relates to an image forming apparatus in which an application is installed, a method for controlling the application in the image forming apparatus, and a program for executing the method.

2. Description of the Related Art

Digital multifunctional apparatuses that include an image scanning section such as a scanner and an image forming section such as a printer, and which handle image information from the image scanning section as digital information, are known. Such digital multifunctional apparatuses have, besides the basic document copy function, the additional function of connecting to a network. Thus, the digital multifunctional apparatuses can perform the print function of printing print data received via the network and the transmission function of transmitting image information scanned by the image scanning section via the network. Among the digital multifunctional apparatuses, some digital multifunctional apparatuses have the function of connecting to a publicly-switched telephone network (PSTN) and performing facsimile communication.

The above-described digital multifunctional apparatuses generally have a display apparatus such as a liquid crystal display (LCD) with a certain degree of resolution. The digital multifunctional apparatuses can execute application programs for allowing a user to use various functions.

For example, Japanese Patent Laid-Open No. 2000-122853 discloses a digital multifunctional apparatus that can enhance, improve, and add functions by installing a program received via a network in the apparatus and allowing the apparatus to execute processing in accordance with the program.

Japanese Patent Laid-Open No. 2002-287990 describes the technique of, not only installing a program in a digital multifunctional apparatus, but also performing other operations, that is, activating, deactivating, and uninstalling the installed program via a network.

SUMMARY OF THE INVENTION

One of the aspects of our invention provides features that the applications can cooperate together to perform predetermined job processing in an image forming apparatus in which multiple applications are installed.

In one of the other aspects of our invention, the applications that cooperate together to perform predetermined job processing can be presented to the user.

According to an aspect of the present invention, an image forming apparatus is provided for managing a software application. Here, the apparatus includes a job generation detecting unit configured to detect that a job is generated in the image forming apparatus; a notification information obtaining unit configured to obtain notification information of the job detected by the job generation detecting unit; and a notification unit configured to send the notification information of the job to the application.

According to another aspect of the present invention, an image forming apparatus is provided for managing a software application. Here, the apparatus includes a completion detecting unit configured to detect completion of processing performed by a first application; a notification information obtaining unit configured to obtain notification information of a job generated in the image forming apparatus by the first application when the completion detecting unit detects the completion of the processing performed by the first application; and a notification unit configured to send the notification information of the job, which is obtained by the notification information obtaining unit, to a second application.

Furthermore, according to another aspect of the present invention, an image forming apparatus is provided for managing a software application. The apparatus includes a storage unit configured to store application definition data describing the type of job that can be accepted by the application; a job generation detecting unit configured to detect that a job is generated in the image forming apparatus; a checking unit configured to check the type of job detected by the job generation detecting unit against the type of job that can be accepted by the application, which is described in the application definition data; an application information displaying unit configured to display, when a check result obtained by the checking unit shows that the type of job detected by the job generation detecting unit matches the type of job that can be accepted by the application, which is described in the application definition data, application information regarding the application on a display unit included in the image forming apparatus such that the application is selectable by a user; and an activation unit configured to activate the application regarding the application information, which is displayed on the display unit by the application information displaying unit and selected by the user.

Moreover, according to another aspect of the present invention, an image forming apparatus is provided for processing a plurality of types of jobs. The apparatus includes a detection unit configured to detect the type of an issued job; a determination unit configured to determine a software application corresponding to the type of the issued job; and a display control unit configured to control a display operation of displaying the application determined by the determination unit on a display unit so as to present the application to a user.

Still further, according to another aspect of the present invention, a control method is provided for an image forming apparatus to manage a software application. The method includes detecting that a job is generated in the image forming apparatus; obtaining notification information of the detected job; and sending the notification information of the job to the application.

Additionally, according to another aspect of the present invention, a control method is provided for an image forming apparatus to manage a software application. Here, the method includes detecting completion of processing performed by a first application; obtaining notification information of a job generated in the image forming apparatus by the first application when it is detected that the processing performed by the first application is completed; and sending the obtained notification information of the job to a second application.

Also, according to yet another aspect of the present invention, a control method is provided for an image forming apparatus to manage a software application. The method includes storing application definition data describing the type of job that can be accepted by the application; detecting that a job is generated in the image forming apparatus; checking the type of the detected job against the type of job that can be accepted by the application, which is described in the application definition data; displaying, when a check result shows that the type of the detected job matches the type of job that can be accepted by the application, which is described in the application definition data, application information regarding the application on a display unit included in the image forming apparatus such that the application is selectable by a user; and activating the application regarding the application information, which is displayed on the display unit and selected by the user.

Moreover, according to another aspect of the present invention, a control method is provided for an image forming apparatus which processes a plurality of types of jobs. Here, the method includes detecting the type of an issued job; determining a software application corresponding to the type of the issued job; and controlling a display operation of displaying the determined application on a display unit so as to present the application to a user.

And further, according to yet another aspect of the present invention, a control program is provided including computer-executable instructions which, when loaded into a programmable image forming apparatus and executed, controls an image forming apparatus to manage a software application. The program includes computer-executable instructions for detecting that a job is generated in the image forming apparatus; computer-executable instructions for obtaining notification information of the detected job; and computer-executable instructions for sending the notification information of the job to the application.

And still further, according to another aspect of the present invention, a computer-readable storage medium is provided containing computer-executable instructions for controlling an image forming apparatus to manage a software application. The program includes computer-executable instructions for detecting that a job is generated in the image forming apparatus; computer-executable instructions for obtaining notification information of the detected job; and computer-executable instructions for sending the notification information of the job to the application.

Other embodiments, features and aspects of the present invention will be apparent from the following description taken in conjunction with the accompanying drawings, in which like reference characters designate the same or similar parts throughout thereof.

BRIEF DESCRIPTION OF THE DRAWINGS

FIG. 3 is a diagram of an example structure of an application management unit 201.

FIG. 4 is a diagram of an example structure of each application definition file 401 stored in the application management unit 201.

FIGS. 12A and 12B are flowcharts of an example process from job generation detection to execution of an application by the application manager 110.

DESCRIPTION OF THE EMBODIMENTS

Numerous embodiments, features and aspects of the present invention will now herein be described with reference to the drawings.

First Exemplary Embodiment

Figure 1:
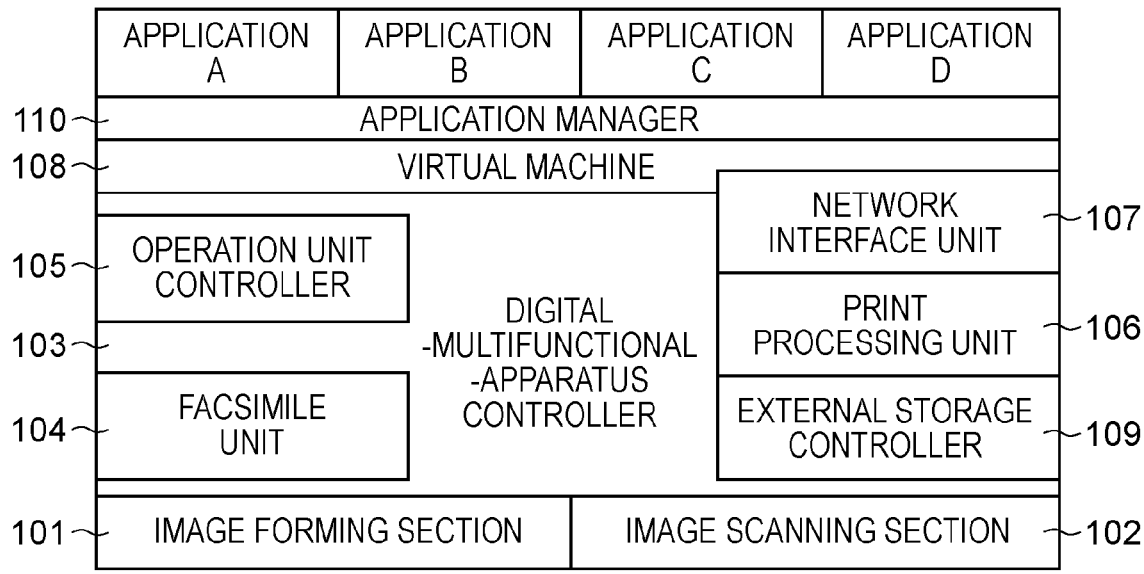
FIG. 1 is a diagram of an example hierarchical structure of a digital multifunctional apparatus.

FIG. 1 is a diagram of the hierarchical structure of a digital multifunctional apparatus according to a first embodiment of the present invention. Referring to FIG. 1, an image forming section 101 executes an image forming process to form an image on a recording medium, such as a sheet of paper. The image forming process includes a series of steps of handling a sheet, transferring an image onto the sheet, and fusing the image on the sheet. The image forming section 101 has, for example, an ink jet printer or an electrophotographic image forming unit.

An image scanning section 102 includes a scanner and optically scans a document image and converts the document image into digital image information. The image scanning section 102 outputs the digital image information to the image forming section 101 to form an image or transfers the digital image information to a facsimile unit 104 or a network interface unit 107 to transmit the digital image information via a line.

A digital-multifunctional-apparatus controller 103 controls the operation of the image forming section 101 and the operation of the image scanning section 102. For example, the digital-multifunctional-apparatus controller 103 controls the image forming section 101 and the image scanning section 102 such that document information scanned by the image scanning section 102 is copied by the image forming section 101. The digital-multifunctional-apparatus controller 103 includes the network interface unit 107, a print processing unit 106, the facsimile unit 104, and an operation unit controller 105 and controls information exchange among these components 104 to 107.

The facsimile unit 104 transmits and receives a facsimile image. Specifically, the facsimile unit 104 transmits the digital image information obtained by the image scanning section 102 or decodes a received facsimile signal, which in turn is recorded by the image forming section 101.

The operation unit controller 105 performs a control operation to generate a signal in accordance with a user operation using an operation panel of an operation unit or to display various data or messages on the operation unit (or a display unit). The print processing unit 106 performs a control operation to process print data input via the network interface unit 107 and to output the processed print data to the image forming section 101, thereby printing the print data. The network interface unit 107 controls transmission and reception of data to and from another communication apparatus via a communication line.

A virtual machine 108 is positioned above the digital-multifunctional-apparatus controller 103. The virtual machine 108 is configured to control the digital-multifunctional-apparatus controller 103.

The network interface unit 107 can be directly used from both the digital-multifunctional-apparatus controller 103 and the virtual machine 108. This enables the digital-multifunctional-apparatus controller 103 and the virtual machine 108 to independently access an external network.

Applications A to D written in a programming language supported by an application programming interface (API) provided by the virtual machine 108 are positioned above the virtual machine 108. These applications A to D can indirectly affect the digital-multifunctional-apparatus controller 103 via the virtual machine 108 or activate the image forming section 101 and the image scanning section 102.

An external storage controller 109 converts the image scanned by the image scanning section 102 into a data format that can be saved to an external storage by the image forming section 101 and saves the converted data to the external storage. The external storage controller 109 reads the data saved in the external storage and prints the data via the image forming section 101 or transmits the data to the outside via the network using the network interface unit 107.

An application manager 110 manages the applications A to D. The application manager 110 accepts activation, deactivation, installing, and uninstalling of each application or receives device information generated by the digital-multifunctional-apparatus controller 103 to control each application.

An application management system according to the first embodiment includes the above-described digital multifunctional apparatus and an application installer 204, which will be described later, connected to the digital multifunctional apparatus such that the application installer 204 and the digital multifunctional apparatus can communicate with each other.

Figure 2:
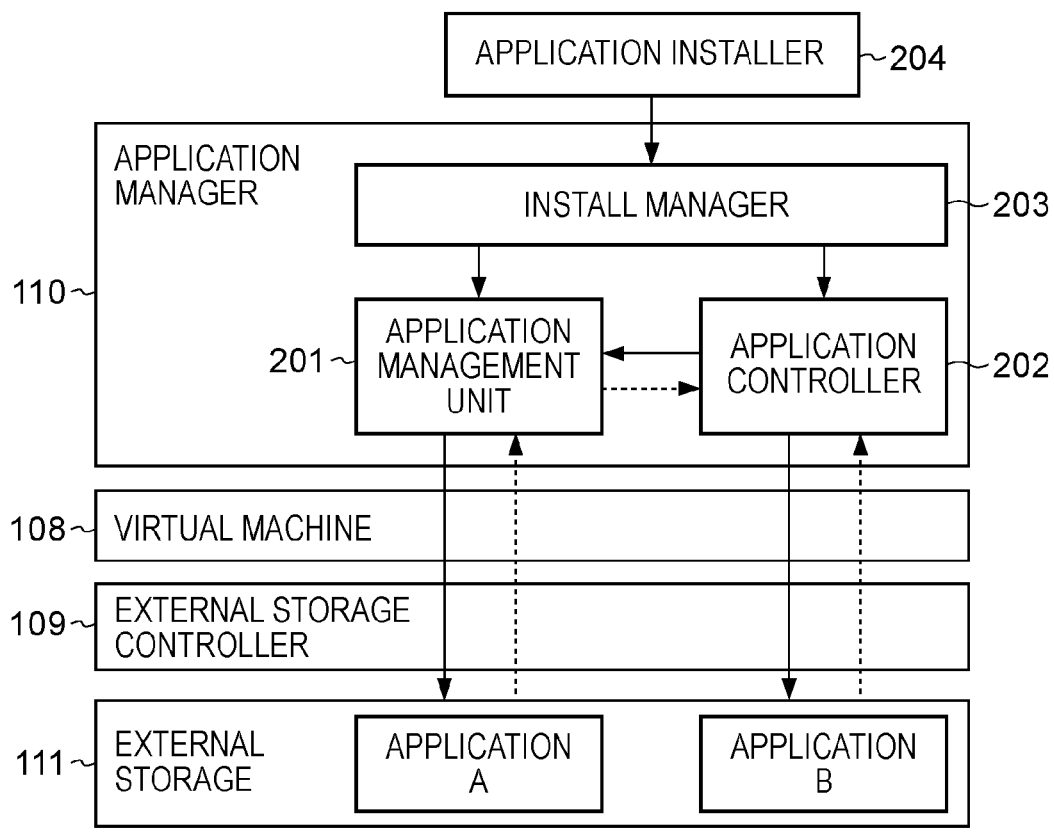
FIG. 2 is a block diagram of the schematic configuration of an example application management system for describing an application manager 110 according to a first embodiment of the present invention.

FIG. 2 is a block diagram of the schematic configuration of the application management system. As shown in FIG. 2, the application management system includes the virtual machine 108, an application installer 204, the application manager 110, the external storage controller 109, and an external storage 111. As has been described above, the application manager 110 manages the applications. The external storage 111 stores a program to be installed.

The application installer 204 may be a web browser connected to the digital multifunctional apparatus via a hypertext transport protocol (HTTP protocol) to install and control an application from a remote environment. Alternatively, the application installer 204 may install and control an application in a local environment using the operation unit (or the display unit) included in the digital multifunctional apparatus. As shown in FIG. 2, the application manager 110 includes an application management unit 201, an application controller 202, and an install manager 203.

The application management unit 201 stores a set of the name of an installed application, path information indicating the path storing a program file of the application, and an application definition file. The install manager 203 accepts installing, activation, and deactivation of an application from the external application installer 204. The application controller 202 receives information generated by the digital-multifunctional-apparatus controller 103 or information generated by the application installer 204 to control each application.

The install manager 203 may be a servlet operating on an HTTP server to accept installing and control of each application from a remote environment via the web. Alternatively, the install manager 203 may be an applet to install and control each application in a local environment using the operation unit (or the display unit) included in the digital multifunctional apparatus.

FIG. 3 shows the structure of the application management unit 201. As has been described above, the application management unit 201 stores a set of the name of an installed application, path information indicating the path storing a program file of the application, and an application definition file.

FIG. 4 shows the structure of each application definition file 401 stored in the application management unit 201. As shown in FIG. 4, the application definition file 401 includes the version of the definition file, the name of the application, a description of the application, the type of job that can be accepted by the application, and the type of job output by executing the application. As shown in FIG. 4, the application definition file 401 further includes the memory size used by the application, information on available resources including persistence, the name of manufacturer of the application, the version of the application, or the like.

A job is a management unit of digital image data generated in the digital-multifunctional-apparatus controller 103 using the functions of the digital multifunctional apparatus. For example, the digital multifunctional apparatus generates a copy job when using the copy function, a scan job when using the scan function, a facsimile job when receiving a facsimile, and a save job when saving data to the external storage connected to the digital multifunctional apparatus.

There may be only one type of job, depending on the job management method of the digital-multifunctional-apparatus controller 103. In this case, the type of job need not be described in each application definition file. In contrast, the type of job may be defined according to the state of a job, depending on the job management method of the digital-multifunctional-apparatus controller 103. The state of a job includes, for example, the state of a job managed in a data format that can be directly analyzed by the print processing unit 106 or the state of a job managed in such a manner that digital data is compressed to be saved to the external storage. To define the type of job according to the job state, the type of job is described in a classified manner in each application definition file 401.

Figure 5:
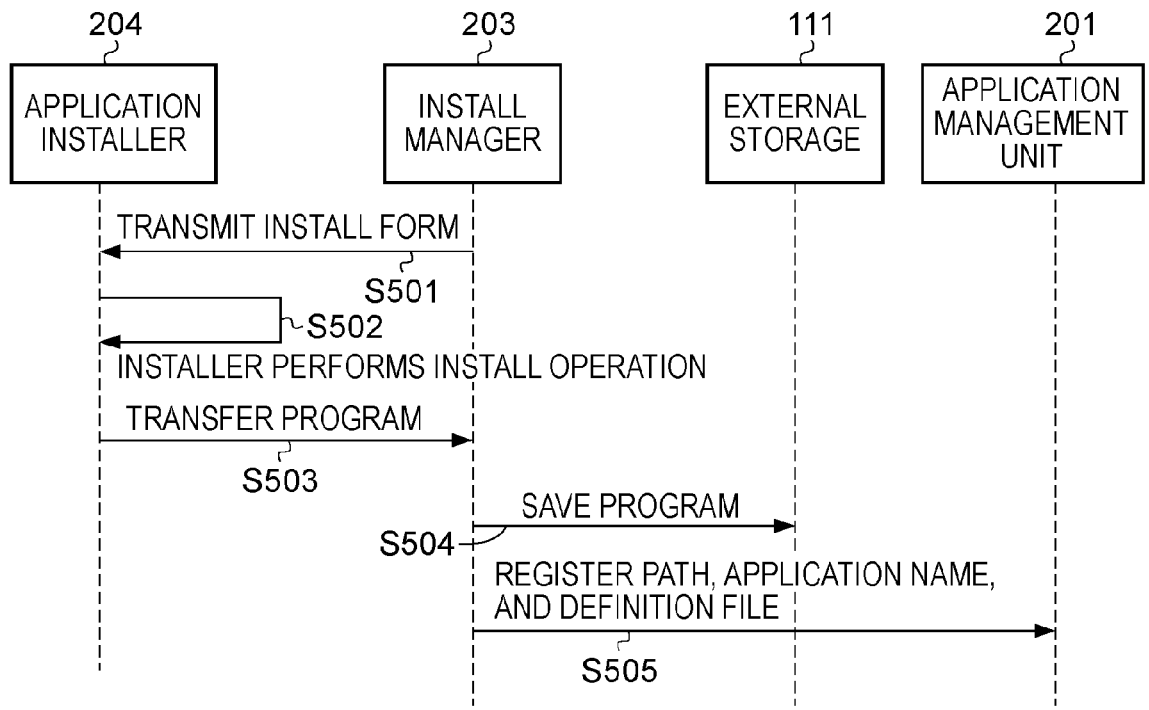
FIG. 5 is a sequence diagram of an example process of installing an application.
Figure 6:
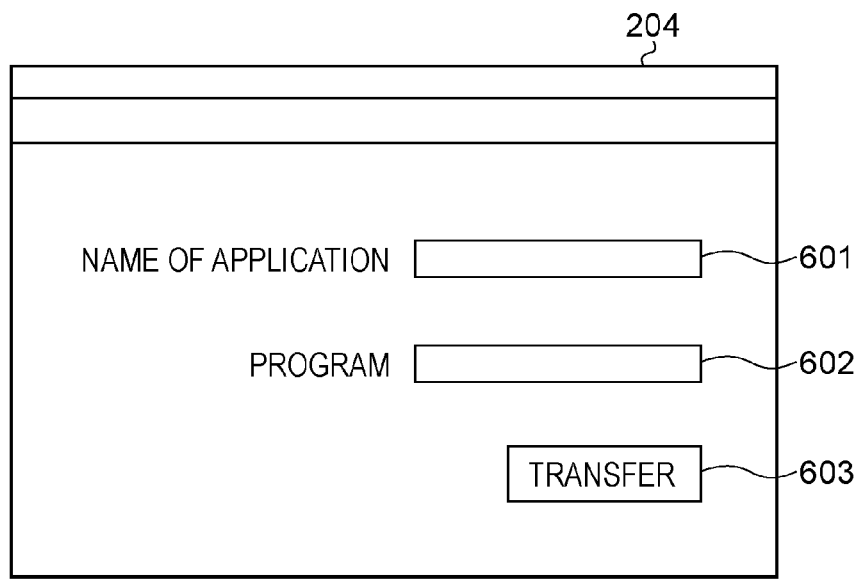
FIG. 6 is a diagram of an example application install screen.

Next, an exemplary process of installing an application will be described with reference to FIGS. 5 and 6. FIG. 5 is a sequence diagram showing the process, and FIG. 6 is a diagram of an application install screen.

As shown in FIG. 5, the install manager 203 transmits an install form to the application installer 204 in response to a request from the application installer 204 (sequence S501). The install form includes, as shown in FIG. 6, a space 601 to enter the name of an application, a space 602 to enter the path storing program data of the application in the application installer 204, and a transfer button 603.

Using the application installer 204, the user enters, on the install form, the application name and the path storing the program in the application installer 204 and presses the transfer button 603 (sequence S502). The application installer 204 transfers, as an install instruction, the name of the application to be installed and the application program data to the install manager 203 in accordance with the defined specification of the install form (sequence S503). At this point, the application program data contains the application definition file 401.

The install manager 203 receives the program data sent from the application installer 204 and saves the program data in a file on the external storage 111 (sequence S504). In addition, the install manager 203 registers the path storing the program, the application name, and the application definition file 401 in the application management unit 201 (sequence S505).

Figure 7:
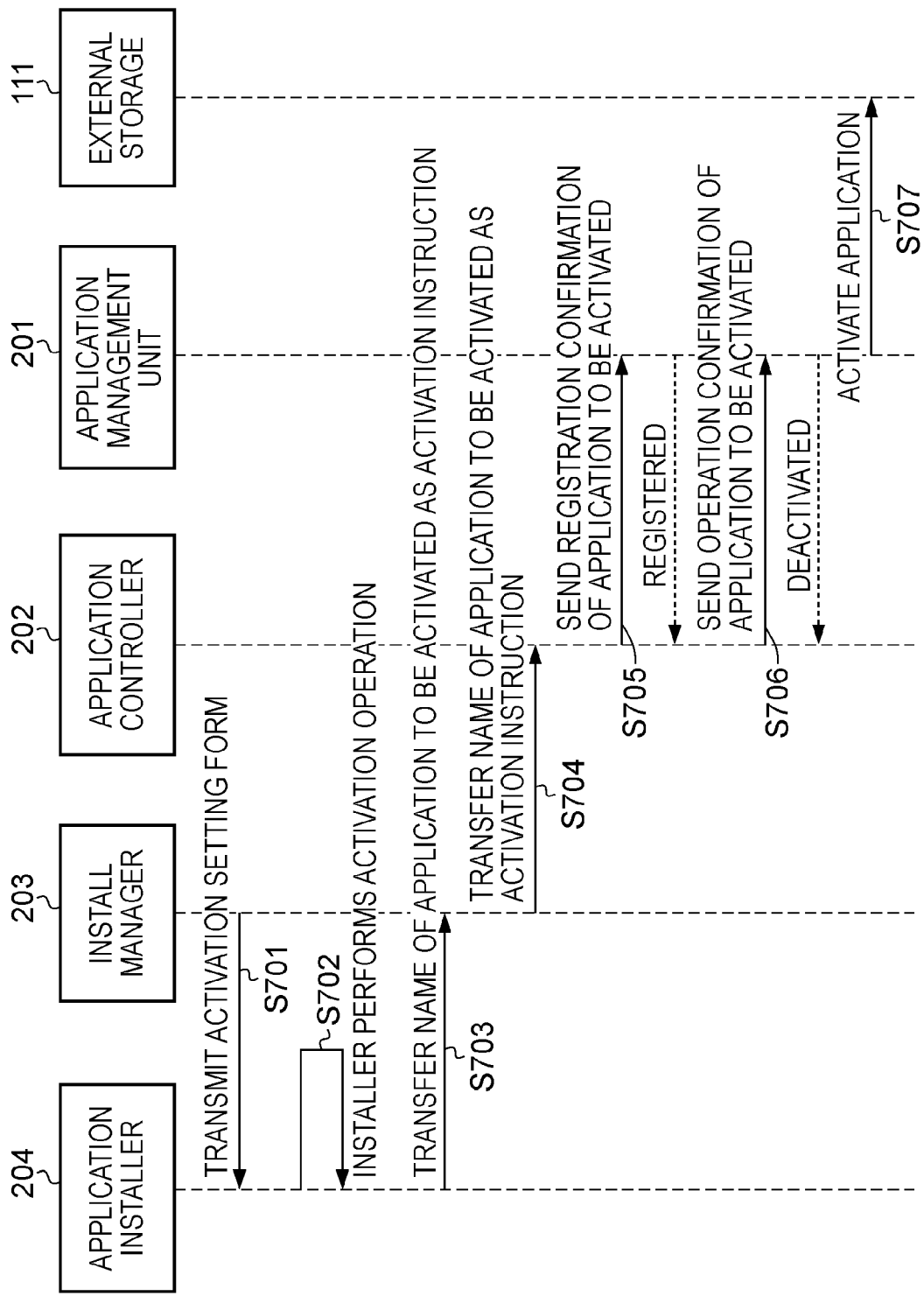
FIG. 7 is a sequence diagram of an example process of controlling an application.
Figure 8:
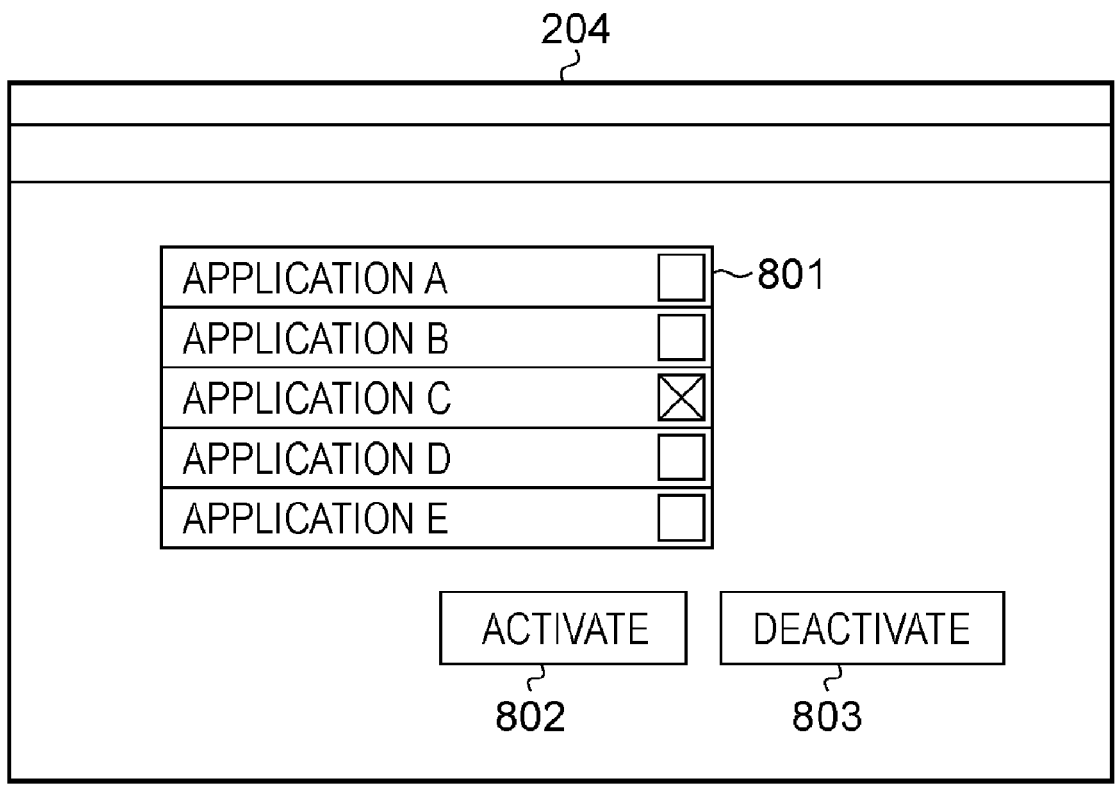
FIG. 8 is a diagram of an example application control screen.

Next, an exemplary process of controlling an application will be described with reference to FIGS. 7 and 8. FIG. 7 is a sequence diagram showing the process, and FIG. 8 is a diagram of an application control screen.

As shown in FIG. 7, the install manager 203 transmits an activation setting form (or data regarding the activation setting form) to the application installer 204 in response to a request from the application installer 204 (sequence S701). The activation setting form includes, as shown in FIG. 8, an application name list 801 including application names and associated check boxes, an activation button 802, and a deactivation button 803.

Using the application installer 204, the user checks on the check box of a desired application to activate in the application name list 801 on the activation setting form and presses the activation button 802 (sequence S702). Then, the application installer 204 transfers, as a program activation instruction, the name of the application to be activated to the install manager 203 in accordance with the defined specification of the activation setting form (sequence S703).

The install manager 203 receives the application name sent from the application installer 204 and transfers, as a program activation instruction, the name of the application to be activated to the application controller 202 (sequence S704).

The application controller 202 receives the name of the application to be activated, which serves as the activation instruction, from the install manager 203 and transfers a registration confirmation request to the application management unit 201, asking whether the application with that name is registered or not (sequence S705).

When the application with that name is not registered in the application management unit 201, the application management unit 201 ends the control process shown in FIG. 7. In contrast, when the application with that name is registered in the application management unit 201, the application management unit 201 returns information indicating that the application is registered to the application controller 202.

The application controller 202 receives the information indicating that the application is registered and sends an operation confirmation request to the application management unit 201, asking whether the application with that name is operating or not (sequence S706).

When the application with that name is operating, the application management unit 201 ends the control process shown in FIG. 7. In contrast, when the application with that name is not operating, the application management unit 201 obtains the path information indicating the path storing the program file of that application on the basis of the application name. On the basis of the path information, the application management unit 201 loads the program data file from the external storage 111 and activates the application (sequence S707).

The digital multifunctional apparatus according to the first embodiment includes the application manager 110, which manages the operation of multiple applications operating on the virtual machine 108, and the install manager 203 operating on the application manager 110. Therefore, an application can be installed, activated, or deactivated in the digital multifunctional apparatus using, for example, the application installer 204 at a remote place. In other words, a program can be easily added, activated, or deleted without affecting another application running on an embedded apparatus, such as the digital multifunctional apparatus.

Now, other exemplary embodiments using the above-described digital multifunctional apparatus will be described as second and third embodiments.

Second Exemplary Embodiment

Figure 9:
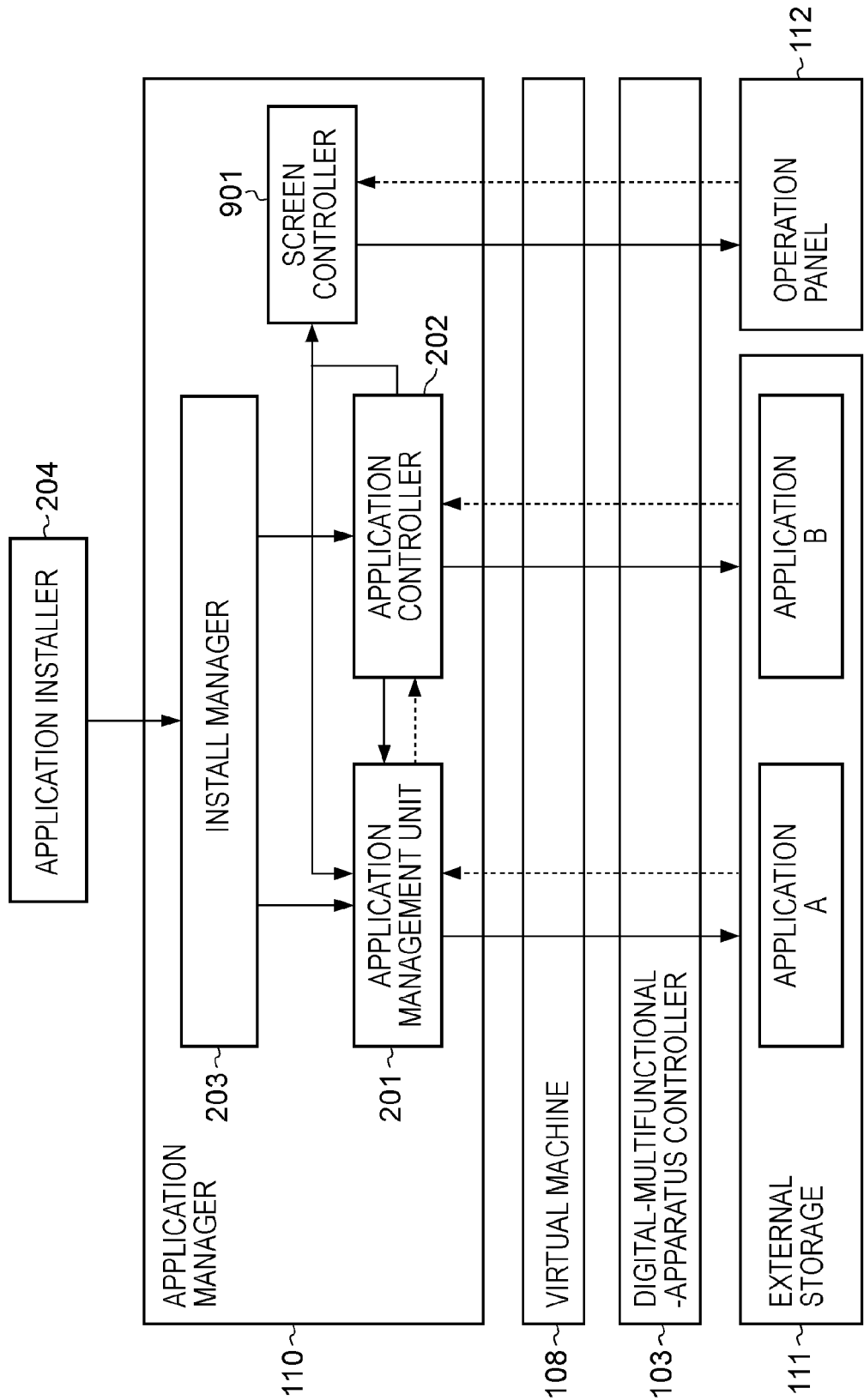
FIG. 9 is a block diagram of an example configuration of an application management system according to a second embodiment of the present invention.

FIG. 9 is a block diagram showing the configuration of an application management system according to a second embodiment. In comparison with the application management system shown in FIG. 2, the application management system shown in FIG. 9 includes an additional screen controller 901 in the application manager 110. The screen controller 901 controls the display operation of an operation panel 112 of the digital multifunctional apparatus and accepts inputs from the operation panel 112.

The operation panel 112 of the digital multifunctional apparatus has an interface for presenting information to the user and an interface for accepting information from the user. That is, the operation panel 112 includes, for example, a touch-panel-type liquid crystal screen and push buttons serving as the input interface.

When activated, the application manager 110 registers a job generation notification request in the digital-multifunctional-apparatus controller 103. This allows the digital-multifunctional-apparatus controller 103 to send notification information 1001 to the application manager 110 when a job serving as digital data to be processed by the digital multifunctional apparatus is generated.

The job generation timing is as follows. For example, image data scanned by the image scanning section 102 is converted into digital image information, and this digital image information is generated as a scan job in the digital-multifunctional-apparatus controller 103. For example, a facsimile signal received by the facsimile unit 104 is decoded, and this decoded signal is generated as a facsimile job in the digital-multifunctional-apparatus controller 103. For example, print data received via the network interface unit 107 is processed, and the processed data is generated as a print job in the digital-multifunctional-apparatus controller 103.

Figure 10:
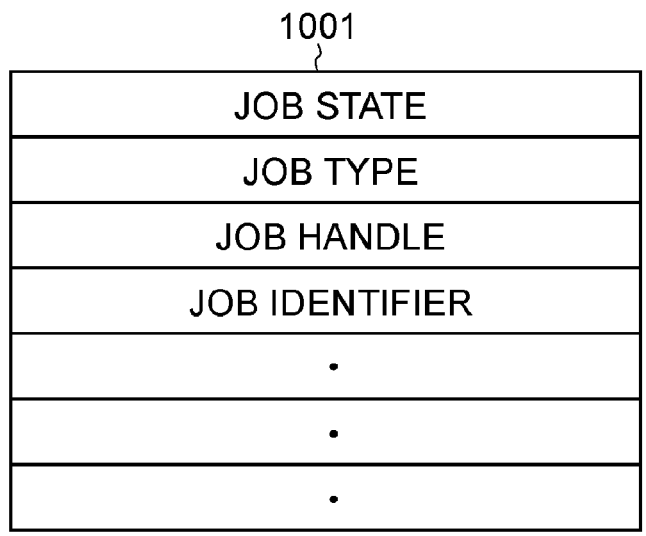
FIG. 10 is a diagram of an example structure of notification information sent from a digital-multifunctional-apparatus controller 103 when a job is generated.

At the time the job is generated, the digital-multifunctional-apparatus controller 103 sends the notification information 1001 to the device that has registered the job generation notification request, namely, the application manager 110. As shown in FIG. 10, the notification information 1001 includes the job state indicating the state in which the job is generated, the type of the generated job, a job handle for managing the job in the digital-multifunctional-apparatus controller 103, and a job identifier for specifying the job. FIG. 10 shows the structure of the notification information 1001 sent from the digital-multifunctional-apparatus controller 103 when the job is generated.

On the basis of the notification information 1001, the application manager 110 detects that the job in a controllable format is generated in the digital-multifunctional-apparatus controller 103. Using the job handle included in the notification information 1001, the application manager 110 controls the generated job for the digital-multifunctional-apparatus controller 103.

The method of detecting, by the application manager 110, that a job is generated in the digital-multifunctional-apparatus controller 103 is not limited to the above method. For example, the application manager 110 may periodically check the digital-multifunctional-apparatus controller 103 to see whether a job has been generated or not.

Figure 11:
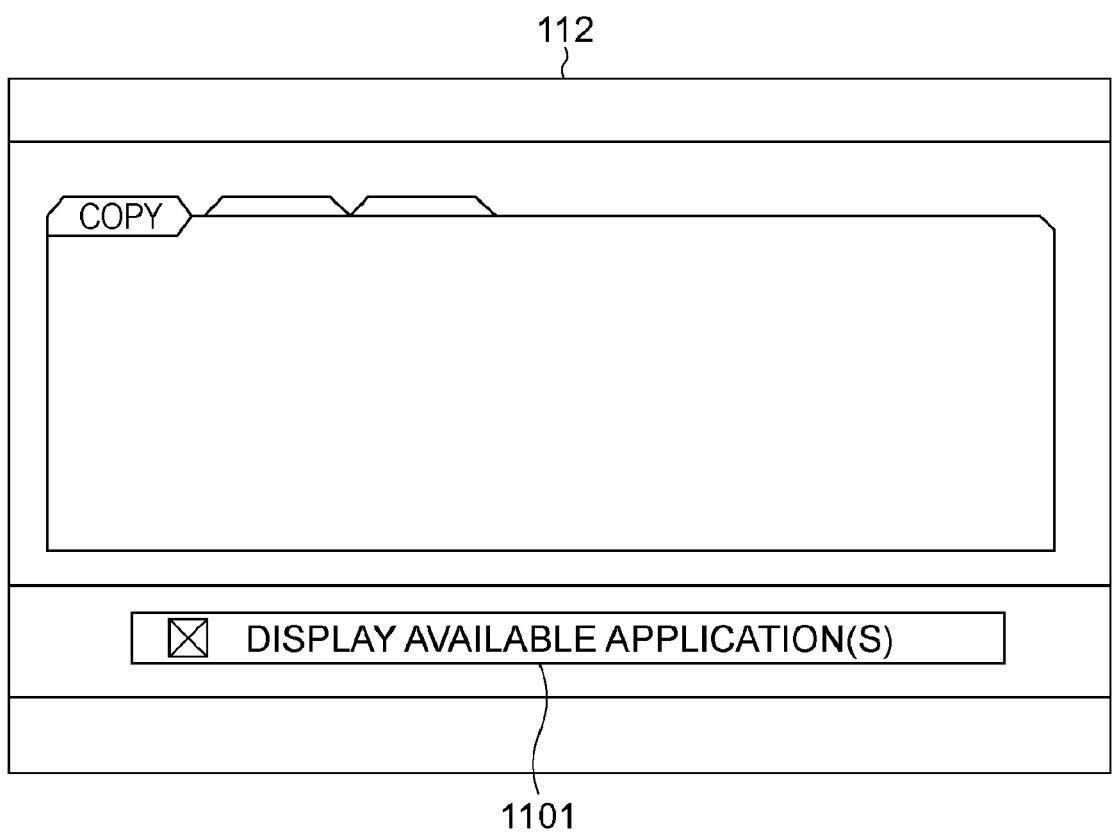
FIG. 11 is a diagram of an example application selection display screen.

Next, the application manager 110 controls the operation unit controller 105 via the digital-multifunctional-apparatus controller 103 to display a check box 1101 whereby the user selects whether to display available applications, as shown in FIG. 11. FIG. 11 is a diagram of an application selection display screen.

When the check box 1101 is not checked by the user, an application management method described in the second embodiment is not performed, and the general functions of the digital multifunctional apparatus are performed.

Alternatively, for example, the application manager 110 may additionally have the function of managing user information. According to the user, an application that has been displayed once may not be automatically displayed on the operation panel 112. In this case, the application manager 110 obtains login information including user information of the user via the operation panel 112, distinguishes the user, and manages information identifying the application that has been displayed to that user. The application manager 110 determines, according to the user, whether the application has already been displayed once. In contrast, the application manager 110 may automatically display a newly installed application on the operation panel 112.

Figures 12, 12A:
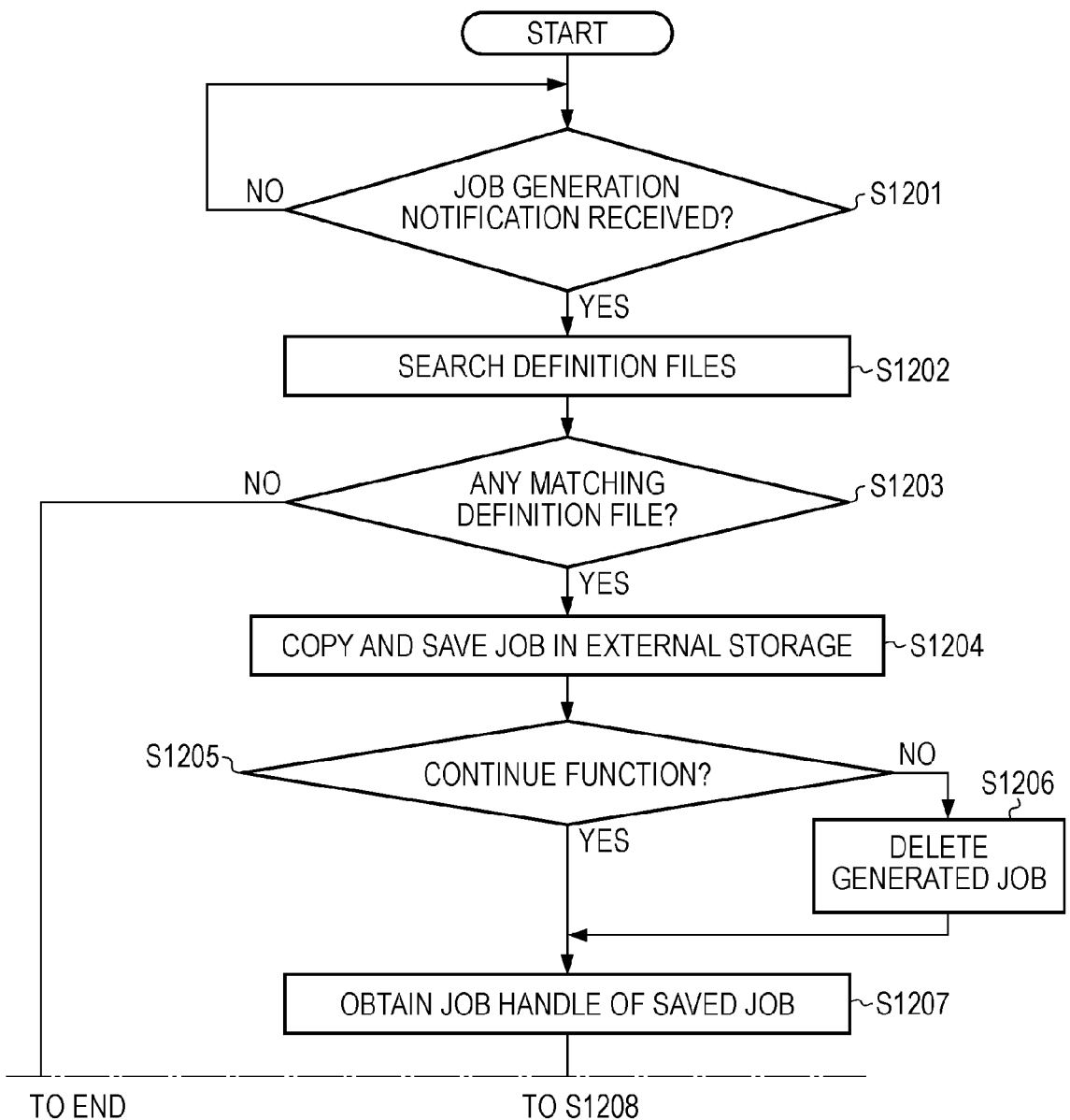
Figure 13:
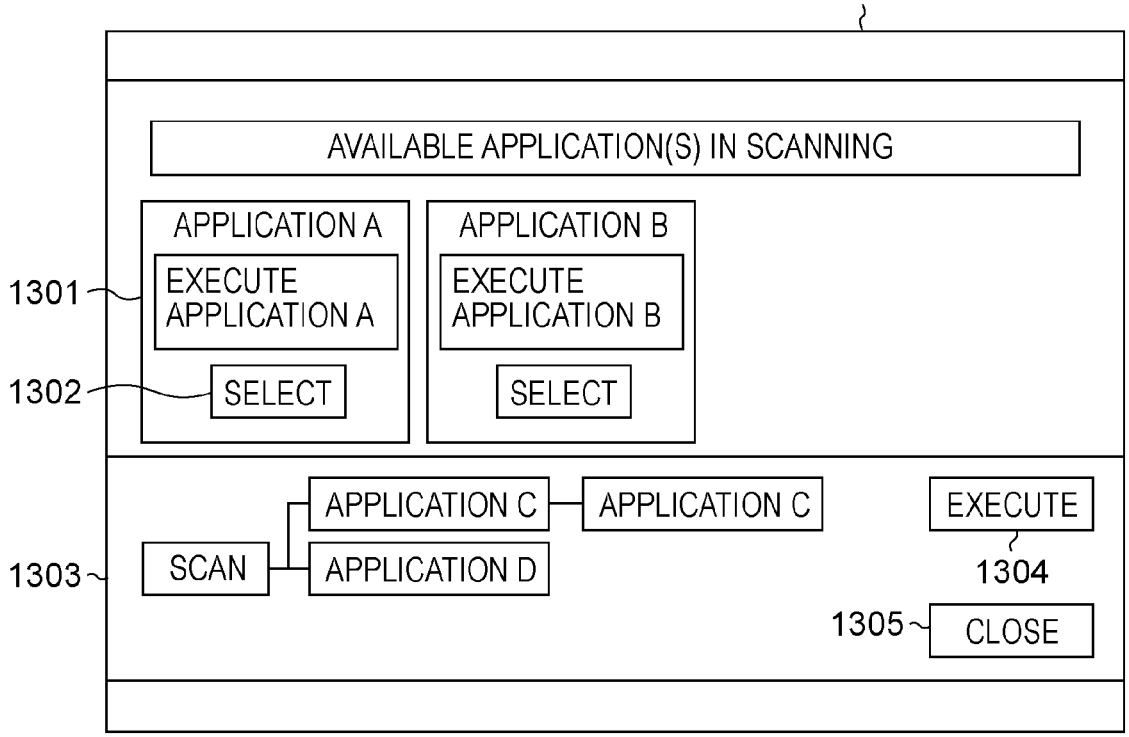
FIG. 13 is a diagram of an example available-application presenting screen.
Figure 14:
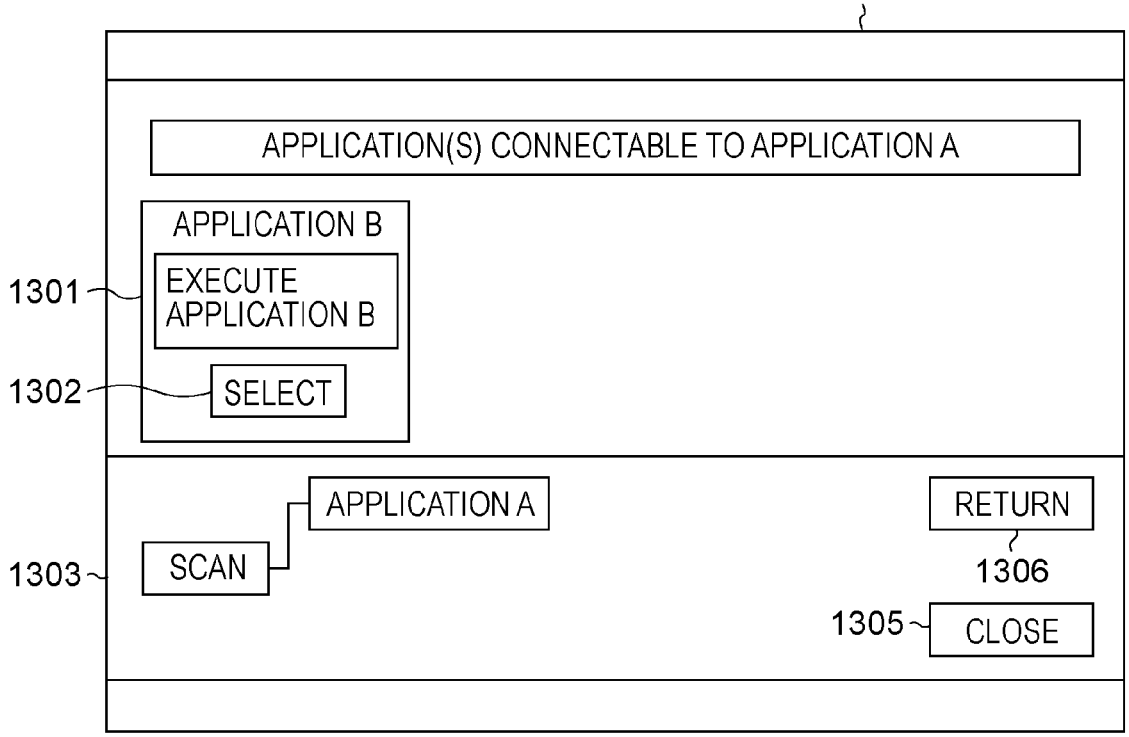
FIG. 14 is a diagram of an example connectable-application presenting screen.

With reference to FIGS. 12A and 12B, 13, and 14, an exemplary operation of the digital multifunctional apparatus in the case that the check box 1101 is checked will be described. FIGS. 12A and 12B include flowcharts of a process from job generation detection to execution of an application by the application manager 110. FIG. 13 is a diagram of an available-application presenting screen. FIG. 14 is a connectable-application presenting screen.

When the user wants to use one of the known functions of the digital multifunctional apparatus, such as the function of sending a copied or scanned image via email, the digital-multifunctional-apparatus controller 103 generates a job and sends the notification information 1001 to notify the application manager 110 of generation of a job (step S1201).

On the basis of the type of job included in the sent notification information 1001, the application manager 110 searches the acceptable job types described in the corresponding application definition files 401 managed in the application management unit 201 (step S1202).

On the basis of the search result, the application manager 110 determines whether the type of job included in the sent notification information 1001 matches any of the acceptable job types described in the application definition files 401 managed in the application management unit 201 (step S1203). When it is determined that the two job types match each other ("YES" in step S1203), the application manager 110 proceeds to step S1204. Otherwise ("NO" in step S1203), the process shown in FIGS. 12A and 12B is ended.

In step S1204, the application manager 110 uses the job handle in the notification information 1001 to copy the generated job and stores the copied job as a "saved job" on the external storage 111. In this case, the application manager 110 specifies the job identifier and saves the copied job. The job identifier is required to be unique only within the digital multifunctional apparatus. The application manager 110 generates, for example, a universal unique identifier (UUID) and uses this UUID as a job identifier.

Next, the application manager 110 determines whether the user wants to continue using the known function of the digital multifunctional apparatus, such as the copy function or the data transfer function via a network (step S1205). In this case, the application manager 110 determines whether to continue using the function on the basis of preset information. To this end, the selection display screen shown in FIG. 11 may include an additional check box to be checked when the user wants to continue using the function. On the basis of the check box, the determination whether the user wants to continue using the function may be made.

When it is determined to continue using the function ("YES" in step S1205), the application manager 110 proceeds to step S1207. In contrast, when it is determined not to continue using the function ("NO" in step S1205), the application manager 110 proceeds to step S1206.

In step S1206, the application manager 110 uses the job handle in the sent notification information 1001 to control deletion of the generated job, thereby deleting the generated job.

In step S1207, the application manager 110 obtains the job handle of the job copied and saved in step S1204. For example, when the copied job is saved in step S1204, the application manager 110 receives and saves the notification information 1001 serving as a generation notification of the saved job, which is issued by the external storage 111. The application manager 110 checks the job identifier set in the notification information 1001 against the job identifier specified in step S1204 to specify the notification information 1001 regarding the generation notification of the corresponding copied job. The application manager 110 then obtains the job handle in the specified notification information 1001. As has been described above, the application manager 110 uses the job handle to control deletion of the generated job, thereby deleting the generated job.

When the application manager 110 copies the job and saves the copied job in step S1204, the digital-multifunctional-apparatus controller 103 may be structured to return the job handle of the saved job to the application manager 110. With this structure, the application manager 110 need not specify the job identifier in step S1204.

The application manager 110 sends, to the screen controller 901, the application definition file 401 of the application in which the type of job is determined in step S1203 to match the acceptable job type. On the basis of the received application definition file 401, the screen controller 901 displays the application corresponding to the application definition file 401 as an available application, as shown in FIG. 13 (step S1208).

As shown in FIG. 13, the available-application presenting screen is displayed on the operation panel 112 and includes an area 1301 presenting the name of an available application and a description of the application and a selection button 1302 for selecting the application. The available-application presenting screen further includes an area 1303 for displaying the names of applications that have already been selected, an execution button 1304 for starting sequential execution of the applications displayed in the area 1303, and a close button 1305 for canceling the process. A method of displaying the area 1303 on the operation panel 112 will be described later.

Referring to FIG. 13, the user presses the selection button 1302 of one of the applications that the user wants to use. Detecting that the selection button 1302 is pressed, the screen controller 901 in step S1209 searches the application definition files 401 on the basis of the output job type included in the application definition file 401 of the selected application. That is, the screen controller 901 searches the application management unit 201 for the application having the acceptable job type that matches the output job type, the acceptable job type being described in the corresponding application definition file 401.

As shown in FIG. 14, after processing performed by the application selected by the user is completed, the screen controller 901 displays the application, which is detected in step S1209 as a connectable application (step S1210). The connectable-application presenting screen shown in FIG. 14 includes, besides the elements of the available-application presenting screen shown in FIG. 13, an additional return button 1306.

The user can select a plurality of applications on the available-application presenting screen shown in FIG. 13. When the user selects multiple applications, the screen controller 901 displays the connectable-application presenting screen shown in FIG. 14 for each of the selected applications.

When the user completes a series of application selecting operations and presses the execution button 1304 shown in FIG. 13, the selected applications are sequentially executed.

With continued reference to FIGS. 12A and 12B, the operation of the digital multifunctional apparatus in the case that the user selects applications and presses the execution button 1304 will be described.

When the execution button 1304 is pressed, the screen controller 901 notifies the application controller 202 of the names of the selected applications. In response to the notification, the application controller 202 obtains path information of an application corresponding to one of the application names, which is stored in the application management unit 201, loads the application from the external storage 111, and executes the application. In this case, the application controller 202 sends job handle information included in the notification information 1001 sent from the digital-multifunctional-apparatus controller 103 as additional information to the application (step S1211).

Then, the application controller 202 detects completion of processing performed by the activated application. When the application has generated a job, the application controller 202 receives a job handle of the generated job (step S1212).

After the completion of the processing performed by the application, the application controller 202 determines whether there is an application specified to be connected (step S1213). When it is determined that there is an application specified to be connected ("YES" in step S1213), the application controller 202 proceeds to step S1214. In contrast, when it is determined that there is no application to be connected ("NO" in step S1213), the application controller 202 proceeds to step S1215.

In step S1214, on the basis of the name of the application specified to be connected, the application controller 202 obtains path information of the application from the application management unit 201. On basis of the path information, the application controller 202 activates the application specified to be connected. In step S1214, the application controller 202 specifies the received job handle and activates the application specified to be connected.

In step S1215, the application controller 202 determines whether there is another application whose selection button 1302 has been selected (selected application). If it is determined that there is another selected application ("YES" in step S1215), the application controller 202 returns to step S1211. In contrast, if it is determined that there is no more selected application ("NO" in step S1215), the application controller 202 ends the process shown in FIGS. 12A and 12B.

The application controller 202 continues executing the process from step S1211 to step S1215 until the execution of all the selected or connected applications is completed.

As has been described above, according to the second embodiment, when multiple applications are installed in the digital multifunctional apparatus, the user can simultaneously use the applications that can be executed by the same operation without needing to perform multiple operations. Thus, the digital multifunctional apparatus becomes user-friendlier. Depending on the type of job output by each application, multiple applications can be connected and used. This further enhances the user-friendliness of the digital multifunctional apparatus. The known functions of the digital multifunctional apparatus can be continuously performed, and one operation can achieve various output results.

According to the second embodiment, the user can easily understand available applications in conjunction with operating the digital multifunctional apparatus. Furthermore, the user can easily select and execute applications installed in the digital multifunctional apparatus.

Third Exemplary Embodiment

Figure 15:
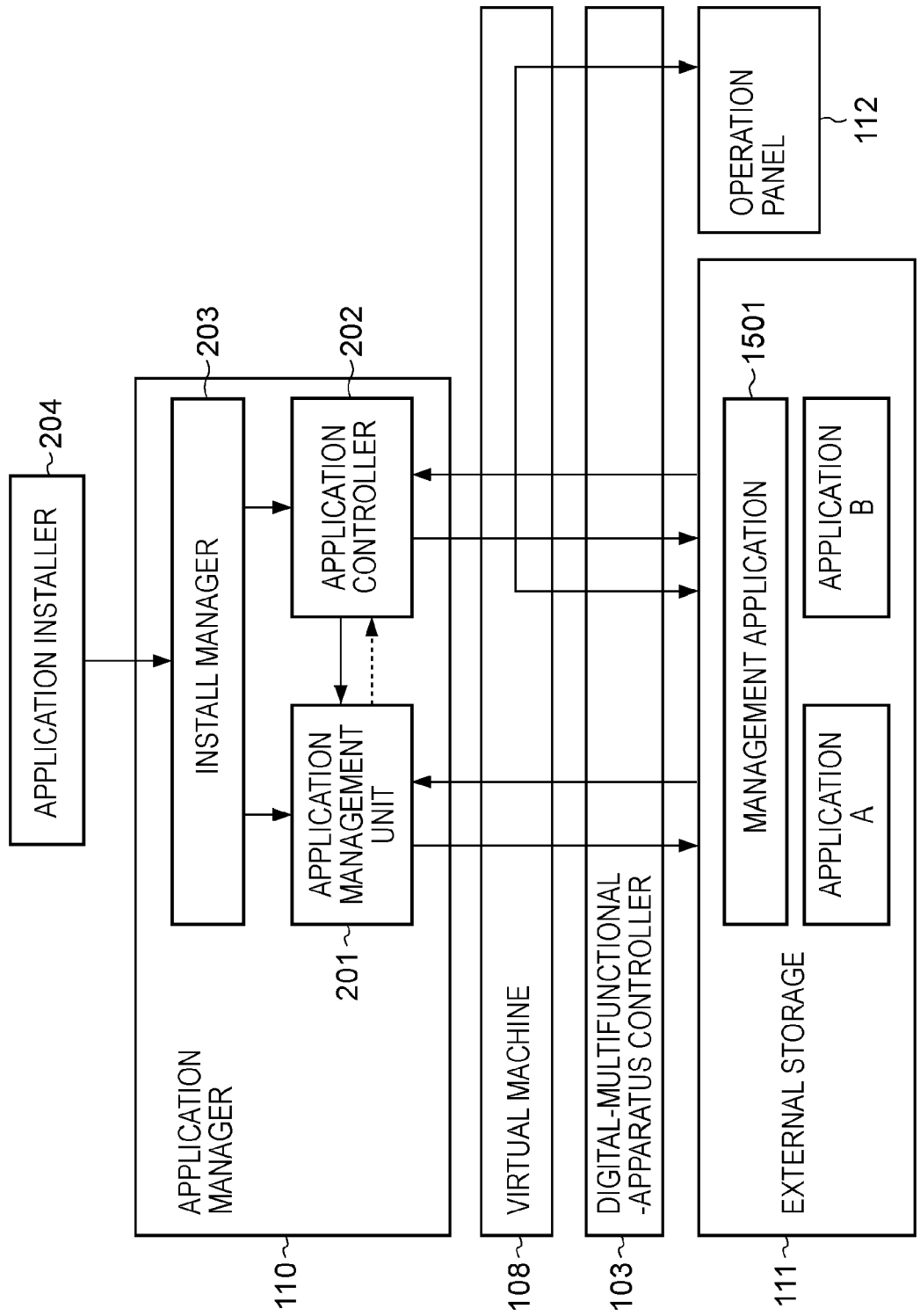
FIG. 15 is a block diagram of an example configuration of an application management system according to a third embodiment of the present invention.

FIG. 15 is a block diagram of the configuration of an application management system according to a third embodiment. The application management system shown in FIG. 15 installs, in the external storage 111, a management application 1501 for managing installed applications using the application manager 110.

The management application 1501 can communicate with the application management unit 201 and the application controller 202 included in the application manager 110. Also, the management application 1501 controls the display operation of the operation panel 112 of the digital multifunctional apparatus and accepts inputs from the operation panel 112.

The operation panel 112 of the digital multifunctional apparatus has an interface for presenting information to the user and an interface for accepting information from the user. That is, the operation panel 112 includes, for example, a touch-panel-type liquid crystal screen and push buttons serving as the input interface.

When activated, the management application 1501 registers a job generation notification request in the digital-multifunctional-apparatus controller 103. This allows the digital-multifunctional-apparatus controller 103 to send the notification information 1001 to the management application 1501 when a job serving as digital data to be processed by the digital multifunctional apparatus is generated.

The job generation timing is as follows. For example, image data scanned by the image scanning section 102 is converted into digital image information, and this digital image information is generated as a scan job in the digital-multifunctional-apparatus controller 103. For example, a facsimile signal received by the facsimile unit 104 is decoded, and this decoded signal is generated as a facsimile job in the digital-multifunctional-apparatus controller 103. For example, print data received via the network interface unit 107 is processed, and the processed data is generated as a print job in the digital-multifunctional-apparatus controller 103.

At the time the job is generated, the digital-multifunctional-apparatus controller 103 sends the notification information 1001 to the device that has registered the job generation notification request, namely, the management application 1501. As shown in FIG. 10, the notification information 1001 includes the job state indicating the state in which the job is generated, the type of the generated job, the job handle for managing the job in the digital-multifunctional-apparatus controller 103, and the job identifier for specifying the job.

On the basis of the notification information 1001, the management application 1501 detects that the job in a controllable format is generated in the digital-multifunctional-apparatus controller 103. Using the job handle included in the notification information 1001, the management application 1501 controls the generated job for the digital-multifunctional-apparatus controller 103.

The method of detecting, by the management application 1501, that a job is generated in the digital-multifunctionalapparatus controller 103 is not limited to the above method. For example, the management application 1501 can periodically check the digital-multifunctional-apparatus controller 103 to see whether a job is generated or not.

The management application 1501 can perform processing similar to that performed by the application manager 110 of the first and second embodiments, thereby implementing the application management method described in the first and second embodiments.

As has been described above, according to the third embodiment, besides the advantages achieved in the first and second embodiments, the management application 1501 can be activated, deactivated, installed, and uninstalled. That is, the application management method described in the first and second embodiments can be performed only when a specific condition is satisfied or a specific user uses the digital multifunctional apparatus. This is advantageous in an apparatus with limited hardware resources, such as an embedded apparatus.

According to the embodiments described above, in an apparatus in which multiple applications are installed, the applications can cooperate together to perform common processing. According to the embodiments described above, the effective applications that cooperate together to perform common processing can be presented to the user.

Other Exemplary Embodiments

Exemplarily applications include a scanned-data processing application, a document management application, various image processing applications, and an email sending application.

For example, assume that a scan operation is executed in response to a user instruction. The digital-multifunctional-apparatus controller 103 generates a job and sends the notification information 1001 to notify the application manager 110 of generation of a job.

The application manager 110 copies the job on the basis of a job handle included in the sent notification information 1001 and saves the copied job as a "saved job" on the external storage 111. In this case, the application manager 110 specifies the job identifier and saves the copied job.

When the application manager 110 detects the generation of the saved job, and when the job identifier of the generated job matches the specified job identifier, the application manager 110 maintains the job handle of that job.

Next, the application manager 110 searches for an application in which a scan job is registered as the acceptable job type. As a result, the scanned-data processing application is displayed as an available application.

Now, assume that the user selects the scanned-data processing application. In addition, assume that the type of job output by the scanned-data processing application is a print job, and the acceptable job type of the document management application is a print job. In such a case, the document management application is displayed as a connectable application.

When the user selects to connect the document management application to the scanned-data processing application and gives an instruction to execute these applications, the names of the applications to be connected are sent to the application controller 202.

On the basis of the sent information, the application controller 202 activates the scanned-data processing application and sends the job handle to the scanned-data processing application. The scanned-data processing application processes the scanned data. As a result, a print job is generated, and the job handle of the print job is returned to the application controller 202.

Next, the application controller 202 sends the job handle to the document management application and activates the document management application. Using the job handle, the document management application registers and updates a document in a box.

Although the operation flow in the case of a scan job has been described above, the operation flow is similar in the case of an application having another acceptable job type.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-134318 filed May 12, 2006, which is hereby incorporated by reference herein in its entirety.

What is claimed is:

1. An image forming apparatus, including a printing unit and a scanning unit, for managing an application, the image forming apparatus comprising:
 a storage unit configured to store definition files describing information on a type of job acceptable to a first application and information on a second application capable of sequentially executing jobs executed by the first application, for each managed application;
 a generation detecting unit configured to detect that either a copy job or a scan job is generated in the image forming apparatus;
 a search unit configured to search for a definition file to accept a detected job among the stored definition files based on information on a type of the detected job;
 a display unit configured to display a list of first applications corresponding to respective searched-for definition files on a presenting screen, to specify a second application capable of sequentially executing jobs executed by a first application selected on the presenting screen based on a definition file corresponding to the selected first application, and to display the specified second application on the presenting screen, wherein, after a first application is selected on the presenting screen displaying a list of first applications corresponding to respective searched-for definition files, the display unit displays a second application executable in connection with the selected first application;
 a completion detecting unit configured to detect completion of processing performed by the first application;
 a notification information obtaining unit configured to obtain notification information of a job generated in the image forming apparatus by the first application in response to the completion detecting unit detecting the completion of the processing performed by the first application; and
 a notification unit configured to send the notification information of the job generated by the first application, which is obtained by the notification information obtaining unit, to the second application, wherein the second application that receives the notification information is started to perform processing.

2. An image forming apparatus according to claim 1, wherein the second application carries out the job on a basis of the notification information.

3. A control method for an image forming apparatus, including a printing unit and a scanning unit, for managing an application, the control method comprising:
- storing definition files describing information on a type of job acceptable to a first application and information on a second application capable of sequentially executing jobs executed by the first application, for each managed application;
- detecting that either a copy job or a scan job is generated in the image forming apparatus;
- searching for a definition file to accept a detected job among the stored definition files based on information on a type of the detected job;
- displaying a list of first applications corresponding to respective searched-for definition files on a presenting screen, to specify a second application capable of sequentially executing jobs executed by a first application selected on the presenting screen based on a definition file corresponding to the selected first application, and displaying the specified second application on the presenting screen, wherein, after a first application is selected on the presenting screen displaying a list of first applications corresponding to respective searched-for definition files, displaying includes displaying a second application executable in connection with the selected first application;
- detecting completion of processing performed by the first application;
- obtaining notification information of a job generated in the image forming apparatus by the first application in response to detecting the completion of the processing performed by the first application; and
- sending the obtained notification information of the job generated by the first application to the second application, wherein the second application that receives the notification information is started to perform processing.

4. A control method according to claim 3, wherein the second application carries out the job on a basis of the notification information.

5. An image forming apparatus according to claim 1,
wherein the detected job is a scan job that is generated in response to a scan function being used,
wherein the first application is capable of inputting the scan job, performs processing of scan data, and outputs a print job,
wherein the second application is capable of inputting a print job, and performs processing to register a document in a box, and
wherein the display unit displays the first application capable of inputting the scan job in the presenting screen, and displays the second application capable of inputting the print job in the presenting screen after the first application is selected.

6. A control method according to claim 3,
wherein the detected job is a scan job that is generated in response to a scan function being used,
wherein the first application is capable of inputting the scan job, performs processing of scan data, and outputs a print job,
wherein the second application is capable of inputting a print job, and performs processing to register a document in a box,
wherein the first application is displayed in the presenting screen, and
wherein the second application is displayed in the presenting screen after the first application is selected.

7. A non-transitory computer readable medium storing a program that causes an image forming apparatus to perform the control method according to claim 3.

8. A non-transitory computer-readable medium according to claim 7,
wherein the detected job is a scan job that is generated in response to a scan function being used,
wherein the first application is capable of inputting the scan job, performs processing of scan data, and outputs a print job,
wherein the second application is capable of inputting a print job, and performs processing to register a document in a box,
wherein the first application is displayed in the presenting screen, and
wherein the second application is displayed in the presenting screen after the first application is selected.

* * * * *